Figure 1:
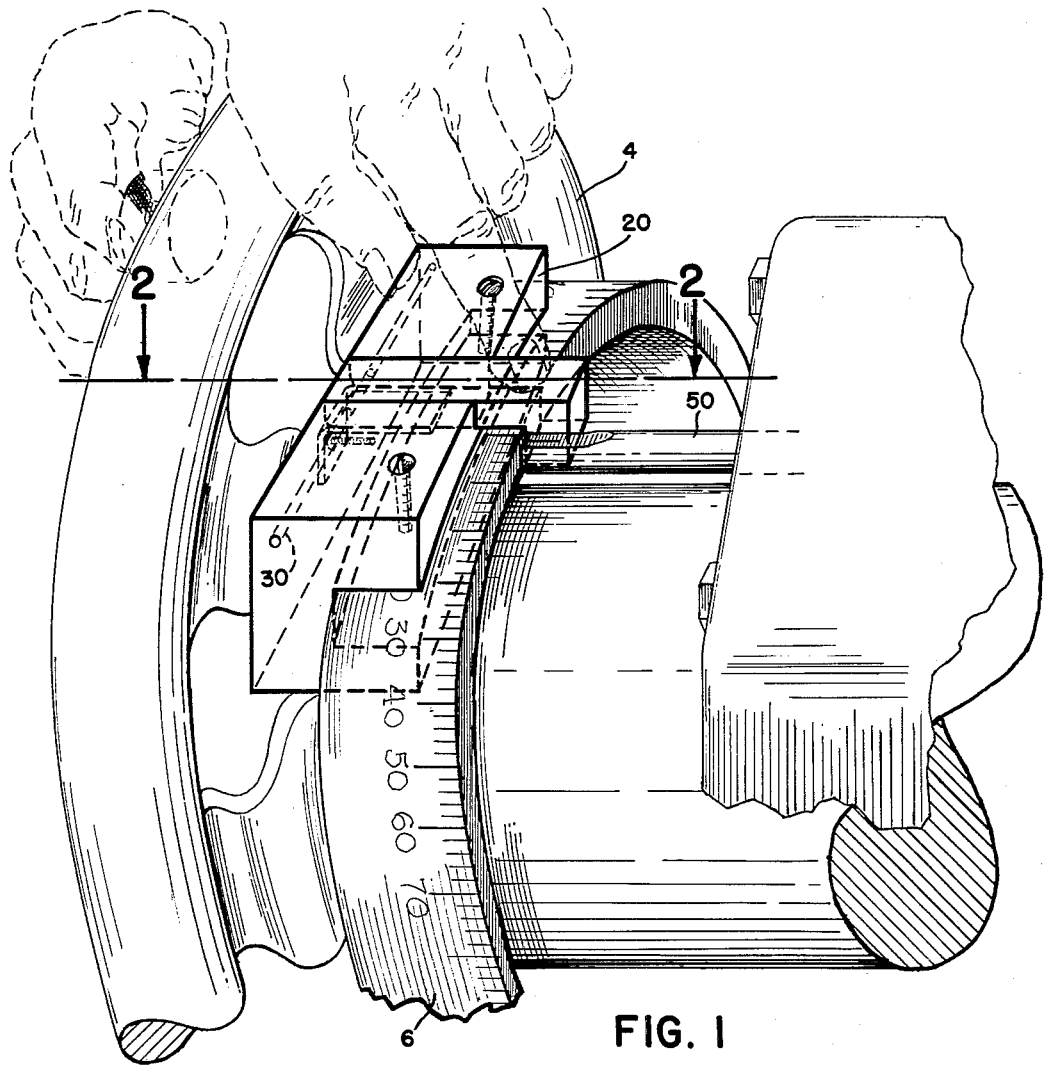

Aug. 23, 1955  C. W. CROWLEY  2,715,885
ADJUSTABLE HAND STOP FOR MACHINE FEEDS
Filed May 4, 1953

INVENTOR
CHARLES W. CROWLEY

BY

ATTORNEYS

United States Patent Office 2,715,885
Patented Aug. 23, 1955

2,715,885

ADJUSTABLE HAND STOP FOR MACHINE FEEDS

Charles W. Crowley, Medford, Mass.

Application May 4, 1953, Serial No. 353,024

5 Claims. (Cl. 116—115)

(Granted under Title 35, U. S. Code (1952), sec. 266)

The invention described herein may be manufactured and used by or for the Government of the United States of America for governmental purposes without the payment of any royalties thereon or therefor.

The present invention relates in general to apparatus used with machinery to limit predeterminatively the movement of a member, and more specifically to a novel, adjustable stop for successively and very accurately limiting the movement of a machine member to a predetermined degree.

In the operation of a common machine tool such as a turret lathe, a cross carriage is very frequently predeterminatively limited in movement. The position of the cross carriage is adjusted by turning a cross carriage hand wheel, the position of the cross carriage at all times being indicated by a rigid index post facing and cooperating with a circular graduated cross carriage dial that is adapted to rotate in response to the rotation of the hand wheel.

Heretofore when operations requiring the movement of the cross carriage were performed, the hand wheel was rotated until the reading corresponding to the desired position of the cross carriage was indicated by the index post facing the dial. Since on most turret lathes one graduation on the dial usually represents no less than 0.002 inch of movement of the cross carriage, fine tolerances of ±0.0005 inch in the adjustment of the cross carriage were difficult to hold.

The present invention as disclosed herein is an adjustable hand stop that may be used with such a turret lathe. It makes use of the fact that the dial and the cross carriage are mechanically coupled so that if the dial is prevented from further rotation at a particular phase of an operation, the cross carriage will also be prevented from further movement. The present hand stop is so constructed that when it is firmly installed on a particular portion of the dial, it is adapted to bear firmly against the rigid index post when the cross carriage is at its desired position, and thereby prevents any further movement of the cross carriage beyond this position. In addition to its advantage of providing greater accuracy in an operation, the hand stop also provides a decided advantage when repetitions are required of an operation necessitating close tolerances, for once the hand stop has been installed for one operation no time consuming and exacting adjustments need to be made for any number of identical operations that may follow.

Therefore a primary object of the present invention is to provide a stop for use on machine tools that predeterminatively and successively limits the movement of a member within a minimum amount of time in a simple manner and with a high degree of accuracy.

Figure 2:
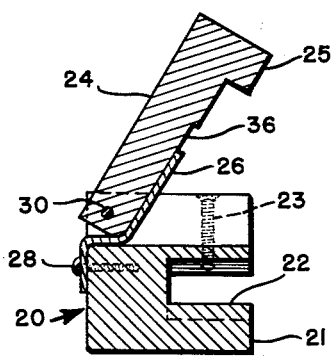

Other objects and many of the attendant advantages of this invention will readily be appreciated as the same becomes better understood by reference to the following detailed description when considered in connection with the accompanying drawings wherein:

Fig. 1 is a perspective view of a preferred embodiment of the present invention installed on the cross carriage dial of a turret lathe; and Fig. 2 is a cross-sectional view of the novel stop member taken along line 2—2 of Fig. 1.

Referring now to Fig. 1, there is shown a preferred form of the hand stop 20 as it is used with a turret lathe having a cross carriage hand wheel 4, a graduated cross carriage dial 6, and a cross carriage (not shown). Normally, in the operation of a turret lathe, the cross carriage is adjusted in position by turning the hand wheel 4. The position of the cross carriage is indicated at all times by the fixed index post 50 facing the graduated cross carriage dial 6, which is adapted to rotate in response to the rotation of the hand wheel 4.

Referring now to both Figs. 1 and 2, the hand stop 20 comprises a base portion 21 having cut therein an arcuate slot 22 machined to conform to the thickness and the radius of the carriage dial 6 whereby base portion 21 fits snugly over dial 6. The hand stop may be firmly secured to dial 6 by means of set screws 23 which are radially disposed relative to the arcuate slot 22. As seen in Fig. 1, the depth of slot 22 is preferably limited to the extent necessary to assure that the stop will not obscure the graduated scale on dial 6. Cut in the upper surface of base portion 21 is a rectangular slot 32 spaced from and running transversely of said arcuate slot 22. Slot 32 is adapted to accommodate an arm of substantially L-shape having a longitudinal portion 24 and an overhanging end portion 25. The arm is further characterized by an undercut surface 36 adapted to accommodate spring 26. In order to prevent side play of the arm within slot 32, the arm is machined to conform to the rectangular cross-section of slot 32. The arm is pivotally mounted within slot 32 by pivot pin 30 running transversely of slot 32. The arm is normally biased in the position shown in Fig. 2 by a flat steel spring 26 fastened to base portion 21 by a rivet 28. The lower corner of the arm at the end nearest pivot pin 30 is preferably rounded off in order to facilitate movement relative to spring 26. The arm is undercut sufficiently at 36 to allow sliding contact between the spring and the arm when the arm is raised and lowered and to permit proper contact between the under surface of the arm and the bottom of groove 32 when the arm is manually forced into its "down" position within and parallel to the slot as illustrated in Fig. 1.

The length of the arm is such that, when stop member 20 is installed on dial 6 as shown in Fig. 1 and the arm forced into its "down" position, the arm extends beyond the edge of dial 6 and end portion 25 engages index post 50 upon rotation of dial 6, as illustrated in Fig. 1. When the arm is in its normal "up" position as illustrated in Fig. 2, the turret lathe can be operated as if no stop member were present, i. e., the hand stop has no limiting or stopping effect.

To properly install stop 20 on a turret lathe, for example, the cross carriage is first accurately located at the position at which it is to be predeterminately limited. Gauges or other suitable devices may be employed for this purpose. The stop member is then placed on dial 6 and secured thereto by means of set screws 23 so that the arm when in its down position bears firmly against that side of index post 50 toward which the dial would be rotated, the position of the stop member being such as to stop rotation of dial 6 at the predetermined limiting position of the cross carriage. In other words movement of the cross carriage is accurately limited by limiting rotation of dial 6.

Once the hand stop has been thus installed, operation of the turret lathe, in which movement of its cross carriage is to be accurately limited at some predetermined position, is very simple. The arm of the stop member is allowed to be in its normal "up" position as the hand wheel 4 is rotated. Then as the cross carriage approaches its predetermined limiting position, the arm is manually forced down so as to cause end portion 25 to engage and firmly bear against index post 50 when the desired limiting position has been reached. Upon release of the manual force on the arm, spring 26 will lift the arm clear of the index post and the hand wheel may be rotated to move the carriage in either direction from its previous operating position.

Any number of identical operations may be made in the same manner.

It is evident, for example, that the hand stop disclosed herein is very desirable when turning bar stock where short lengths and close tolerance cut offs are required. It will apply equally well when doing chuck work, and can be used either on the dial plate of the apron for cross cuts or on the dial plate of the carriage for longitudinal stops and settings.

Obviously many modifications and variations of the present invention are possible in the light of the above teachings. It is therefore to be understood that within the scope of the appended claims the invention may be practiced otherwise than as specifically described.

What is claimed is:

1. A stop for use with a machine tool comprising a base portion having an arcuate slot cut therein for adjustably positioning said stop, an arm pivotally secured to said base portion and movable about its pivot point in a plane perpendicular to a plane parallel to the radius of said arcuate slot, and resilient means secured to said base portion and cooperating with said base portion and said arm for biasing said arm away from said base portion.

2. A stop of the type defined by claim 1 having means cooperating with said arcuate slot for securing said stop to a rotatable member of a machine tool.

3. In combination with a machine tool having a fixed index member and a rotatable dial member spaced from said fixed index member, a stop comprising, a solid base portion, means including an arcuate slot in said base member for securing said base member to the periphery of said rotatable dial member, means pivotally secured to said base member adapted to be moved into a first position to engage said fixed index member upon predetermined movement of said dial member, and resilient means secured to said base member normally biasing said pivoted member out of engagement with said fixed index member.

4. The combination of claim 3 wherein the means pivotally secured to said base member comprises an arm having a main stem portion and an end portion integral to and offset from said main stem portion.

5. The combination of claim 4 wherein the base portion has a second slot cut therein adapted to receive said pivoted arm in said first position.

References Cited in the file of this patent

UNITED STATES PATENTS

| | | |
|---|---|---|
| 247,853 | Scott | Oct. 4, 1881 |
| 874,176 | Fischer | Dec. 17, 1907 |
| 1,088,965 | Bullard | Mar. 3, 1914 |
| 1,768,495 | Schroder | June 24, 1930 |
| 2,362,275 | Jacobs | Nov. 7, 1944 |